United States Patent
Bollepally et al.

(10) Patent No.: US 11,797,431 B2
(45) Date of Patent: Oct. 24, 2023

(54) REST API PARSER FOR TEST AUTOMATION

(71) Applicant: ORACLE INTERNATIONAL CORPORATION, Redwood Shores, CA (US)

(72) Inventors: Showrya Bollepally, Hyderabad (IN); Debopam K. Sharma, Bangalore (IN); Robins Yadav, Bijnor (IN)

(73) Assignee: Oracle International Corporation, Redwood Shores, CA (US)

( * ) Notice: Subject to any disclaimer, the term of this patent is extended or adjusted under 35 U.S.C. 154(b) by 117 days.

(21) Appl. No.: 17/561,221

(22) Filed: Dec. 23, 2021

(65) Prior Publication Data

US 2023/0205678 A1    Jun. 29, 2023

(51) Int. Cl.
*G06F 11/36* (2006.01)
*G06F 9/54* (2006.01)

(52) U.S. Cl.
CPC .......... *G06F 11/3688* (2013.01); *G06F 9/547* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 7,506,311 B2 | 3/2009 | Subramanian et al. | |
| 2014/0075242 A1* | 3/2014 | Dolinina | G06F 11/3672 714/E11.178 |
| 2019/0268442 A1* | 8/2019 | Puniani | G06F 9/547 |
| 2022/0382665 A1* | 12/2022 | Sokhin | G06F 11/3684 |

OTHER PUBLICATIONS

Hackage; Curl-runnings: A framework for declaratively writing curl based API tests, pp. 1-6, downloaded on Dec. 21, 2021 from: https://hackage.haskell.org/package/curl-runnings.

Cadman et al.; Curl-runnings, examples; pp. 1-4; downloaded on Dec. 21, 2021 from: https://github.com/aviaviavi/curl-runnings/blob/master/examples/example-spec.json.

AVI Press et al.; Github, A declarative test framework for quickly and easily writing integration tests against JSON API's; pp. 1-4; downloaded on Dec. 21, 2021 from: https://github.com/aviaviavi/curl-runnings#readme.

Postman,Inc.; Testing an API; p. 1, downloaded on Dec. 21, 2021 from: https://learning.postman.com/docs/designing-and-developing-your-api/testing-an-api/#adding-tests.

* cited by examiner

*Primary Examiner* — Qing Chen
(74) *Attorney, Agent, or Firm* — Kraguljac Law Group, LLC

(57) ABSTRACT

Systems, methods, and other embodiments associated with a REST API parser for test automation are described. In one embodiment, a method for automating REST API testing includes parsing a test case to extract values for parts of a REST API request and a value for at least one validation parameter; automatically composing the REST API request at least in part from the extracted values for the parts of the REST API request; automatically submitting the REST API request for execution by an application; retrieving a value of a result of the execution of the REST API request from the application; determining that the value for the validation parameter(s) and the value of the result are a match; and generating an indication that the REST API is valid for the test case.

20 Claims, 4 Drawing Sheets

REST API PARSER FOR TEST AUTOMATION

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

FIELD

Systems, methods, and other embodiments described herein relate to a data processing system or calculating computer designed for or utilized in an environment relating to a testing system. More particularly, systems, methods, and other embodiments described herein relate to a specific testing procedure for preparing code or selecting code to execute and validate REST API requests.

BACKGROUND

A representational state transfer (REST or RESTful) application programming interface (API) is an architectural style for an API that uses hypertext transfer protocol (HTTP) or HTTP secure (HTTPS) requests to access and use data. REST APIs may be tested by executing REST API requests configured for a particular test case, and comparing expected results with actual results of the request. The results are typically very large and validation presents a significant data analysis problem.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
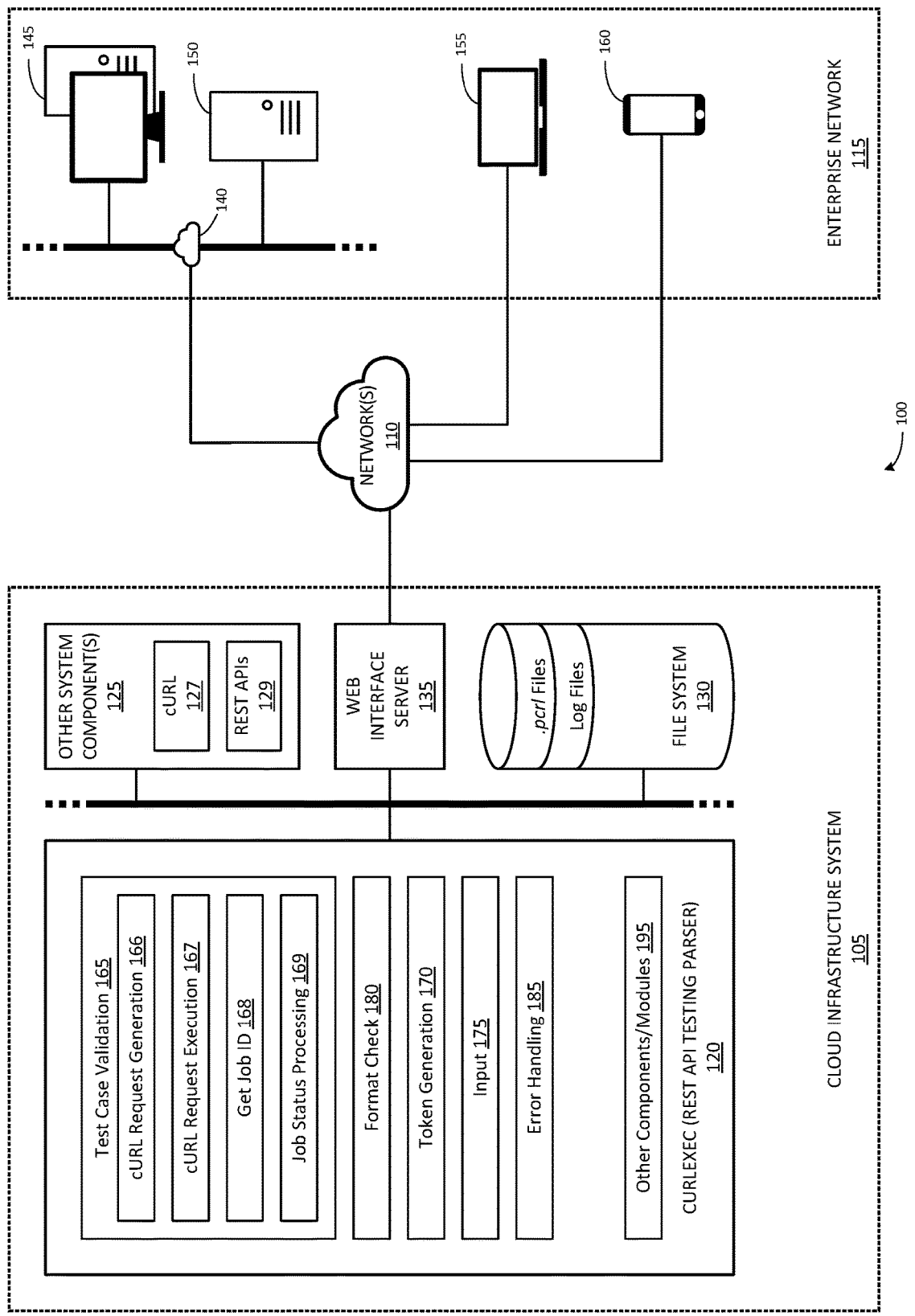
FIG. 1 illustrates one embodiment of a system associated with a REST API parser for test automation.

Systems, methods, and other embodiments are described herein that provide a representational state transfer (REST or RESTful) application programming interface (API) parser for effortless REST API test automation. In one embodiment, the parser offers complete end-to-end automation for REST API requests using Perl. The parser is inbuilt with automatic verification logic. The parser is a near zero-code solution that enables effortless, automated construction and validation of REST API requests and responses.

No action or function described or claimed herein is performed by the human mind. An interpretation that any action or function can be performed in the human mind is inconsistent with and contrary to this disclosure.

A RESTful API is an architectural style for an API that uses hypertext transfer protocol (HTTP) or HTTP secure (HTTPS) requests to access and use data. In cloud services, such as Oracle Autonomous Database (ADB) cloud services for example, REST APIs may be tested using cURL. CURL is a command-line tool for transferring data. CURL supports many protocols, including HTTP/HTTPS.

Table 1 below shows the request (at lines 001-004) and response (at lines 005-433) of a simple GET database cURL call.

TABLE 1

```
05     10   15      20   25      30   35      40   45      50   55   60   65
curl --location --request GET 'https://<server-ip>/<endpoint>' \
--header 'Accept: application/JSON' \
--header 'Request-Id: tv9h4pl5s2sobtiblgs5v4sw' \
--header 'Authorization: Bearer <token>
{
  "name":
  "tenant_name":
  "database_name":
  "guid":
  "id":
  "tenant_id": "*",
  "global_tenant_id":
  "service_id": *,
  "pod_id": *,
  "max_size": *,
  "current_size": *,
  "cpu_count": *,
  "autoscaled_cpu_count": *,
  "status_code": *,
  "resource_id": *,
  "console_url":
  "acl_validation_for_console": *,
  "console_links": [
      {
          "name": "manage_oml_user_url",
          "description": "*",
          "url": "*"
      },
      {
          "name": "*"
          "description": "*",
          "url": "*"
      },
      .
      .
      .
      <400 MORE SUCH LINES OF RESPONSE>
      .
      .
      .
}
05     10   15      20   25      30   35      40   45      50   55   60   65
```

In cURL calls, there are huge data transactions done as part of request and response exchanged between client and server. As can be seen above in Table 1, the response is multi line and may include nested JavaScript object notation (JSON) as well. But, a user may be interested in validation of only selected parts of this huge response. In a shared infrastructure cloud service (such as Oracle ADB-S) or a dedicated infrastructure cloud service (such as Oracle ADB-D), for example, there are hundreds of REST APIs and those can be executed with various combinations of input parameters or operations. This will result in thousands of cURL requests. This presents an immense data analysis problem.

So, there is a need for an automation framework that allows specification of the items that are to be validated. A hand-coded solution, for example using Java or Python, can be used to solve this problem, but that requires writing many lines of code to automate a single test case end to end, where essentially a normal subroutine approach is used. Automating each test case end-to-end requires 50 or more lines of code. Additionally, knowledge of the code base on the part of the coder is also required to be able to invoke the correct pre-existing modules/subroutines for automating the test case. For a large product that needs thousands of test cases, writing so many lines of code is not a scalable solution. In addition to the steep learning curve involved, these test cases that invoke the subroutines also need maintenance over time.

These and other problems are solved by systems, methods, and other embodiments shown and described herein for a REST API parser for test automation, which makes it possible to write a test case using no more than seven simple and straightforward lines of code. There is no need for any extra subroutine to be written and no extra knowledge of code base is required in order to write test cases.

In one embodiment, the parser is named CURLEXEC. In one embodiment, the parser is implemented in Perl to automate REST API requests. In one embodiment, the parser accepts the details of the test cases in a static text file with one or more test cases expressed in a test case format shown in Table 2, below. In one embodiment, a test case file uses a ".pcrl" extension to indicate that it is a file including text code for one or more test cases that are formatted for execution by the parser. The parser evaluates the logical syntactic components (such as keywords) of the contents of a test case file to determine actions to be performed for test case(s) in the test case file. One or more logical syntactic components, or keywords may be referred to herein as an expression or syntactic expression.

text. The expression #Verify: indicates to the parser that text following the colon is the brief description of test case validation.

The third line of code of a test case (appearing at Table 2, line 03) includes an expression that indicates to the parser a nature of the API request under test in the test case. In one embodiment, the third line of code includes the components "operation"=followed by text indicating the method of operation (such as GET/POST/DELETE/PUT) of a REST API request, for example using components such as "GET", "POST", "DELETE", and "PUT", to indicate the nature of the API request. GET, PUT, POST and DELETE are HTTP methods for retrieving from and sending data to a server. Thus, in one embodiment, the parser supports execution and validation of GET, PUT, POST and DELETE methods in cURL requests.

The fourth line of code of a test case (appearing at Table 2, line 04) includes an expression that indicates to the parser an input payload being tested in the test case. In one embodiment, the fourth line of code includes the components "input_params"=followed by additional text describing an input JSON payload to be passed to the REST API request.

The fifth line of code of a test case (appearing at Table 2, line 05) includes an expression that indicates to the parser an expected output or result for the test case from execution of the REST API request used for validation of REST API for the test case. In one embodiment, the fifth line of code includes the components "validate_params"=followed by additional text describing expected output JSON key-value pairs, values, or patterns to be validated in the final response of a server executing the REST API request.

The sixth line of code of a test case (appearing at Table 2, line 06) includes an expression that indicates to the parser a uniform resource locator (URL) or URL segment for the destination data source or other application to execute the

TABLE 2

| #Test Case N | : <Describe test case> |
|---|---|
| #Verify | : <Describe test case validation> |
| "operation" | = <pass request methods : GET/POST/DELETE/PUT> |
| "input_params" | = <pass request payload > |
| "validate_params" | = <pass items to be validated in response> |
| "url" | = <pass endpoint of the REST API> |
| #End | |

In the test case format, the first line of code of a test case (appearing at Table 2, line 01) includes a syntactic expression that indicates to the parser the beginning of a test case in a test case file. In one embodiment, the first line of code includes the syntactic expression #Test Case N: followed by additional text. The expression #Test Case N: indicates to the parser the beginning of a test case in a test case file, and indicates to the parser that text following the colon is a brief description (documentation) of the test case. In one embodiment, the components #Test Case N indicate a number of order of appearance of the test case in the test case file, and may form an identifier for the test case that is unique within the test case file.

The second line of code of a test case (appearing at Table 2, line 02) includes an expression that indicates to the parser that there is a brief description (documentation) of the test case validation. For example, the second line of code includes the components #Verify: followed by additional REST API of the test case. In one embodiment, the sixth line of code includes the components "url"=followed by additional text that is an endpoint of a REST API to which the input payload is to be delivered and from which the output payload is to be received. In one embodiment, the parser constructs a complete URL by adding a server IP address to the endpoint of the REST API indicated by url (that is, the endpoint url is concatenated to the server IP address to form the complete URL to access the REST API endpoint).

The seventh line of code of a test case (appearing at Table 2, line 07) indicates to the parser the end of a test case. In one embodiment, the seventh line of code includes the component #END to indicate the end of the test case.

Thus, in the above seven lines of code that make up the test case format, the #Test Case and #Verify describes the test case and #End marks the ending of the test case, and the "operation", "input_params", "validate_params", and "url" lines contain test case specific information to configure or perform the test case. Note that a "line of code" is an expression that refers to executable statements that describe the test case, and does not necessarily mean that the line of code must be displayed on a single line of an interface. Advantageously, once written, test cases may be re-used in different test suites.

Thus, in one embodiment, the CURLEXEC parser offers a generalized solution where any REST API test case can be automated end-to-end using a .pcrl test case description made up of just seven lines of code. In one embodiment, the parser design is generalized by abstraction at the GET/POST/PUT/DELETE level, which is the entry point of any REST API. In comparison, using an interpreted language (such as Java or Python) to automate each REST API test cases needs a dedicated subroutine to test the REST API because the abstraction is at a lower level. The complexity of expressing test cases for execution by the parser (in just seven executable lines of code) is therefore significantly lower (with at least 3 times less code) than the complexity of writing the same test case in Java or Python (which would require fifty or more lines of code). In one embodiment, a .pcrl file may include an unlimited number of test cases, where each test case is sufficiently described for execution by the parser using just seven lines of code.

Example Environment

FIG. 1 illustrates one embodiment of a system 100 associated with a REST API parser for test automation. In one embodiment, system 100 includes a cloud infrastructure system 105 (or other computing system) that uses REST APIs to communicate between components of the system (such as between layers of the software stack, or between modules, applications, or other components of a computing service). In one embodiment, cloud infrastructure system 105 is Oracle® Cloud Infrastructure. In one embodiment, cloud infrastructure system 105 is a cloud database such as Oracle® Autonomous Database Serverless cloud service. In one embodiment, cloud infrastructure system 105 is connected by Internet 110 (or another suitable communications network or combination of networks) to an enterprise network 115.

In one embodiment, cloud infrastructure system 105 includes various systems and components which include REST API testing parser 120, other system components 125, file system/data store(s) 130, and web interface server 135.

In one embodiment, other system components 125 may include a cURL application 127 for executing network data transfer and cURL's supporting libcurl client-side URL transfer library. In one embodiment, other system components 125 may include REST APIs 129 for modules, applications, or other components of cloud infrastructure system 105. REST APIs 129 may be automatically tested by operation of REST API testing parser 120. In one embodiment, other system components 125 may include autonomous database components for cURL processing and for automation of automated database tuning, security, backups, updates, and other database management tasks. In one embodiment, other system components 125 may include various computing application components for performing client applications. In one embodiment, other system components 125 may further include user administration modules for governing the access of users to cloud infrastructure system 105.

Each of the components of cloud infrastructure system 105 is configured by logic to execute the functions that the component is described as performing. In one embodiment, the components of cloud system may be implemented as sets of one or more software modules executed by one or more computing devices specially configured for such execution. In one embodiment, the components of cloud infrastructure system 105 are implemented on one or more hardware computing devices or hosts interconnected by a data network. For example, the components of cloud infrastructure system 105 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of cloud infrastructure system 105 are implemented by dedicated computing devices. In one embodiment, the components of cloud infrastructure system 105 are implemented by a common (or shared) computing device, even though represented as discrete units in FIG. 1. In one embodiment, cloud infrastructure system 105 may be hosted by a dedicated third party, for example in an infrastructure-as-a-service (IAAS), platform-as-a-service (PAAS), or software-as-a-service (SAAS) architecture.

In one embodiment, the components of system 100 intercommunicate by electronic messages or signals. These electronic messages or signals may be configured as calls to functions or procedures that access the features or data of the component, such as for example API calls. In one embodiment, these electronic messages or signals are sent between hosts in a format compatible with transmission control protocol/internet protocol (TCP/IP) or other computer networking protocol. Each component of system 100 may (i) generate or compose an electronic message or signal to issue a command or request to another component, (ii) transmit the message or signal to other components of computing system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems (such as those of enterprise network 115) may access information or applications provided by cloud infrastructure system 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may request a command-line interface, such as a console GUI. In one example, communications may be exchanged between web interface server 135 and personal computer 145, server 150, remote user computers 155 or mobile device 160, and may take the form of remote REST requests using JavaScript object notation (JSON) as the data interchange format for example, or simple object access protocol (SOAP) requests to and from XML servers. The REST or SOAP requests may include API calls to components of cloud infrastructure system 105. For example, computers 145, 150, 155 of the enterprise network 115 may request execution of REST API test cases using the CURLEXEC parser, as shown and described herein.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to enterprise network 115 through network(s) 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connect to local area network 140 or network(s) 110 through wireless networks, such as cellular telephone networks or Wi-Fi. Users of the enterprise network 115 interface with cloud infrastructure system 105 across network(s) 110.

In one embodiment, file system 130 is a computing stack for the structured storage and retrieval of one or more collections of information or data in non-transitory computer-readable media, for example as one or more data structures. In one embodiment, file system 130 stores and serves files such as test case files (.pcrl files) and/or suites driver files (.pl files).

In one embodiment, REST API testing parser 120 includes one or more components or modules configured for implementing methods, functions, and features described herein associated with automation of REST API testing. In one embodiment, REST API testing parser 120 includes a test case validation module 165. In one embodiment, test case validation module 165 is configured to execute one or more subroutines for executing a test case and confirming whether the REST API performs as expected in response to the test case, for example as shown and described in further detail herein. In one embodiment, test case validation module 165 includes cURL request generation module 166, cURL request execution module 167, get job id module 168, and job status processing module 169. In one embodiment, cURL request generation module 166 is configured to generate cURL requests from parameter values provided in the test case and/or by the parser and pass the cURL requests to execution module 167, for example as shown and described in further detail herein. In one embodiment, cURL request execution module 167 is configured to execute the generated request with cURL application 127, for example as shown and described in further detail herein. In one embodiment, get job id module 168 is configured to retrieve an identifier for a job executing in response to an executed cURL request, for example as shown and described in further detail herein. In one embodiment, job status processing module 169 is configured to validate the results of a test case, for example as shown and described in further detail herein. In one embodiment, REST API testing parser 120 includes: a token generation module 170 configured to generate and refresh authorization tokens for cURL requests; an input module 175 configured to receive test case files; a format check module 180 configured to confirm that test cases in a test case file conform to an expected format; and an error handling module 185 configured to compose and present error messages; all for example as shown and described in further detail herein. In one embodiment, REST API testing parser 120 includes one or more other components or modules 195 configured for implementing methods, functions, and features described herein.

Example Method of CURLEXEC Parser Operation

In one embodiment, each step of computer-implemented methods described herein may be performed by a processor (such as processor 410 as shown and described with reference to FIG. 4) of one or more computing devices (i) accessing memory (such as memory 415 and/or other computing device components shown and described with reference to FIG. 4) and (ii) configured with logic to cause the system to execute the step of the method (such as REST API testing parser logic 430 shown and described with reference to FIG. 4). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 415, or storage/disks 435 of computing device 405 or remote computers 465 shown and described with reference to FIG. 4, or in file system/data stores 130 shown and described with reference to FIG. 1).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 2:
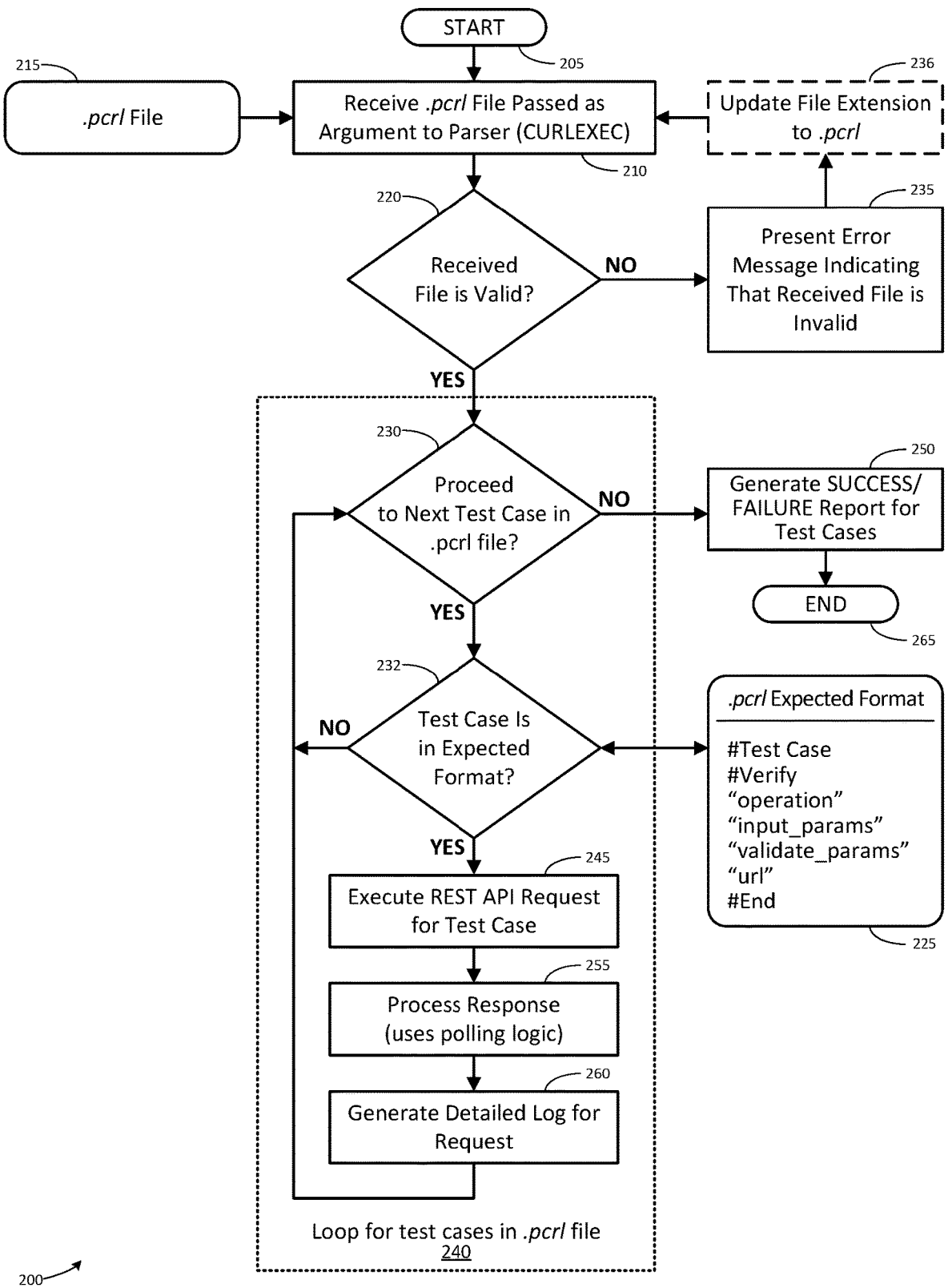
FIG. 2 illustrates one embodiment of a test method associated with a REST API parser for test automation.

FIG. 2 illustrates one embodiment of a test method 200 associated with a REST API parser for test automation. In one embodiment, the steps of method 200 are performed by REST API testing parser 120 (as shown and described with reference to FIG. 1). In one embodiment, REST API testing parser 120 is a special purpose computing device (such as computing device 405) configured with REST API testing parser logic 430. In one embodiment, REST API testing parser 220 is a module of a special purpose computing device configured with logic 430. In one embodiment, one or more computer processors execute the functionality of REST API testing parser 120 as described with reference to method 100 in accordance with REST API testing parser logic 430.

The method 200 may be initiated automatically based on various triggers, such as in response to receiving a signal over a network or parsing stored data indicating that (i) a user (or administrator) of cloud infrastructure system 105 has initiated method 200, (ii) that method 200 is scheduled to be initiated at defined times or time intervals, or (iii) that a command to execute the parser on a .pcrl file has been entered in a user interface (such as a command line interface) of cloud infrastructure system 105. The method 200 initiates at START block 205 in response to parsing a signal received or stored data retrieved and determining that the signal or stored data indicates that the method 200 should begin. Processing continues to process block 210.

At process block 210, the parser receives a .pcrl file 215 passed as an argument to the parser. In one embodiment, a user writes .pcrl file 215 to describe test cases for automated execution. In one embodiment .pcrl file 215 may include one or more test cases written in the format shown in Table 2. In one embodiment, a test case may be executed or run using the parser to automate a REST API test. For example, an example test case file "test.pcrl" (shown in Table 5 below)

may be executed with a one-line command with a single argument such as "curlexec test.pcrl" as part of a Perl file to cloud infrastructure system 105. (Alternatively, the command may be entered at a command line interface and executed.) The name of .pcrl file 215 is thus passed as an argument to the parser.

In one embodiment, a user may assign a custom file name prefix (or suffix) log files. In one embodiment, a test case file may be executed with a one line command with two arguments: a test case file (.pcrl file) name and an optional user-customized logfile name prefix. For example, a first argument: "test.pcrl" contains the test case information; and a second argument (optional): "custom name.log" defines a prefix 'customname' to be used by the parser while generating log files. In one embodiment, where the optional logfile name prefix is not provided as an argument, a default value the same as the .pcrl filename is used. For example, where the only argument passed is filename "test.pcrl", the log prefix is assigned to be 'test'.

In one embodiment, in response to the command the parser performs a check to determine that at least one argument and not more than two arguments have been passed to the parser. If this initial check on argument quantities fails, the parser returns an error, and presents an error message (for example, by printing or writing into a log file or displaying in a command line interface) indicating that the quantity of arguments is not correct and aborts further execution. In one embodiment, collection of error information and generation, composition, and presentation of error messages (for example in a log file, command line interface, or graphical user interface) are implemented by error handling module 185.

In one embodiment, in response to the command the parser performs a check to determine that the argument(s) passed to the parser have expected file extensions. In one embodiment, the parser requires that the first argument has an extension indicating that the file is a test case file, for example having a .pcrl file extension. In one embodiment, the parser requires that the second, optional argument (if any is provided) has an extension indicating that it is a logfile name prefix, for example having a .log file extension.

In one embodiment, in response to the command (and following successful checks) the parser operates to retrieve (or locate) a .pcrl file specified in the command, and place it in a memory location (or record a current location of the .pcrl file in storage) for further processing by the parser.

Thus, in one example, the processor receives a text file that includes a test case among a set of other test cases. In one embodiment, the functions of process block 210 are implemented at least in part by input module 175. At this point, .pcrl file 215 is received and processing at process block 210 then completes, and processing continues to decision block 220.

At decision block 220, the parser determines whether the number of files received is one or two. If the number of files is 1 then it checks whether the files extension is .pcrl. If the number of files received is 2 then it checks whether the extension of first file is .pcrl and extension of second file is .log. In other words, parser accepts minimum one file and maximum two files. The extension of first file should be .pcrl and the extension of second file (if received by the parser) should be .log. If these checks are satisfied (block 220: YES), then the received file(s) are valid, processing at decision block 220 completes, and processing continues at decision block 230. Where the checks of number of files and extension are not satisfied (block 220: NO), the file(s) are not valid, then the parser aborts execution of the test file, processing at decision block 220 completes and processing continues at process block 235 to throw an error. Following completion of decision block 220, pre-processing of .pcrl file 215 is completed.

At process block 235, the parser generates and presents an error message that informs the user that number of files or the extension of the file(s) are not correct. In one embodiment, the parser generates text indicating that the number of files or the extension of the file(s) are not correct. The parser prints the generated text in the log file. Processing then ends, and a user may then correct the input file(s) extension at block 236 in order to execute the test file successfully. Once the extension of the file(s) is corrected at block 236, the user may attempt to re-execute the updated .pcrl file with the parser at process block 210. In this way, if the number of the files or the extension of the file(s) are not correct, then the parser throws an error saying either the number of files is not correct, or the extension of the file(s) are not correct. The user requester should then update the file(s) extension(s) and pass the required number of files to the parser.

In one embodiment, the parser supports the use of variables in place of hard coded values in test case parameters written in a .pcrl file. Values of these variables may be set in a driver file of the test suites. This increases the reusability of test files. A same test file can be used in a same test suite (or different test suite) multiple times with different variable values and run the REST API test cases. Accordingly, in one embodiment, the parser checks the .pcrl file to detect any variables. In response to detecting a variable in the .pcrl file, the parser retrieves the value of the variable from the driver file and replaces the variable in the .pcrl file with the retrieved value. Thus, for example, the processor detects that a part of the REST API request in the test case is a variable; replaces the variable in the test case with a value of the variable; and includes the value of the variable in the automatically composed REST API request.

During execution, the parser processes the test cases in a .pcrl file one-by-one internally and automatically. In one embodiment, the parser parses the test case, generates and executes the cURL requests in JSON format, validates the response, and generates detailed logs for each test case. After validation where all the tests in the file are successfully executed and validated, the parser generates a .suc file (meaning that the test file ran successfully), otherwise the parser generates a .dif file (meaning that there is some issue with one or more test execution). In one embodiment, the parser invokes various modules to perform the processing of test cases. In one embodiment, four subroutines implement the entire process flow of the parser, as shown in pseudo code in Table 3:

TABLE 3

```
sub curl_validateTestCase ( )
{
  sub curl_executeRequest ( );
  sub curl_getJobId ( );
  sub curl_processJobStatus ( );
  sub curl_validateJobResponse ( );
}
```

These subroutines are described in further detail below in context of their use to process test cases.

In one embodiment, processing of the test cases in a .pcrl file may be performed as a loop (such as a while loop or do-while loop) of tasks that repeats for each test case. In other words, the parser loops through one test case after another in .pcrl file 215. In one embodiment, decision block 230 forms the head, beginning, or entry point of a while loop 240 for test case evaluation tasks. In one embodiment, an iteration of loop 240 is initiated by and performed in response to invoking the parent subroutine curl_validateTestCase( ) which is responsible for end-to-end generation and execution of a cURL request to a REST API and validation of the response to the request.

At decision block 230, the parser determines whether there are test cases in the .pcrl file 215 that remain to be evaluated. In one embodiment, the parser determines whether or not there exists a next "#Test Case" component or keyword in .pcrl file 215 following a current position. The current position refers to a position within .pcrl file 215 beyond which the parser has not processed .pcrl file 215 contents with the functionality of loop 240 during execution of method 200. Where there does not exist a next "#Test Case" keyword in .pcrl file 215 following the current position, there is no next test case in .pcrl file 215, and the parser does not proceed to a next test case in the .pcrl file (block 230: NO). Where there does exist a next "#Test Case" keyword in .pcrl file 215 following the current position, the parser evaluates whether a special component or keyword is present in .pcrl file 215 between the current position and the next "#Test Case" keyword. In one embodiment, the special components or keywords include a sleep component, disable component, and an exit component. If a special component or keyword appears before the next "#Test Case" keyword, the processor implements the functionality associated with that special keyword before proceeding to the next test case.

Sleep: in one embodiment, the parser is configured to pause, sleep, wait, or otherwise suspend processing for an amount of time before executing a next test case in .pcrl file 215. In one embodiment, sleep functionality of the parser is triggered in response to parsing a component or keyword such as "sleep" followed by the amount of time (expressed, for example, in seconds). The sleep keyword and wait time or sleep period may be written in .pcrl file 215 (for example by the user) in advance of a test case that is desired to be delayed before execution. In one embodiment, the parser waits until the amount of time has elapsed, and then proceeds to the next test case. For example, at line 17 of Table 5, the sleep component followed by the number 100 causes the parser to delay for 100 seconds before proceeding to the next test case in the .pcrl file, Test Case 2. In this way, the sleep functionality causes the processor to parse a keyword in the text .pcrl file that delays execution of another test case in the text file.

Disable: in one embodiment, the parser is configured to disable a test from the set of test cases in .pcrl file 215. In one embodiment, the disable functionality is triggered in response to parsing a component or keyword such as "#Disable". The "#Disable" keyword may be written in .pcrl file 215 before the test case which is to be disabled. In one embodiment, in response to encountering the "#Disable" keyword in .pcrl file 215, the parser disables, skips, or otherwise does not process or execute the next test case following the "#Disable" and proceeds to processing .pcrl file 215 contents following the "#End" keyword of the disabled test case. For example, at line 35 of Table 5, the #Disable component causes the parser to ignore lines 37-51, disabling or skipping Test Case 3, and resuming processing at line 53.

Exit: in one embodiment, the parser is configured to exit the test process and skip running the remaining tests from any point in .pcrl file 215. In one embodiment, the exit functionality is triggered in response to parsing a component or keyword such as "exit". The "exit" keyword may be written in .pcrl file 215 at any point between two test cases. In one embodiment, in response to encountering the "exit" keyword in .pcrl file 215 the parser skips or otherwise does not process or execute all tests after the point in .pcrl file 215 at which the "exit" keyword appears. The "#Disable" and "exit" keywords trigger similar functions—the disable functionality skips one test after the "#Disable" keyword, and the exit functionality skips all the tests and other content of .pcrl file 215 after the appearance of the "exit" keyword. For example, at line 53 of Table 5, the "exit" keyword causes the parser to ignore all lines subsequent to line 53, disabling or skipping Test Case 4. In one embodiment, execution of the exit functionality by the parser terminates loop 240 because the parser will not proceed to a next test case (block 230: NO).

In this way, both the disable and exit functionality cause the processor to parse a keyword in the text .pcrl file that prevents execution of another test case in the text file.

In one embodiment, the functionality indicated by these keywords is performed by the parser as the keywords are encountered while looping/parsing through one test case after the other.

Where the parser is proceeding to a next test case in the .pcrl file (block 230: YES), then processing at decision block 230 completes, loop 240 is entered for an iteration, and processing continues at decision block 232. Where the parser is not proceeding to a next test case in the .pcrl file (block 230: NO), then processing at decision block 230 completes, loop 240 terminates, and processing continues at process block 250.

At decision block 232, the parser determines whether the current test case is in the expected format 225 in .pcrl file 215. In one embodiment, the parser expects test cases in .pcrl file 215 to be provided in the pre-defined format 225, consistent with that shown in Table 2. In other words, the parser accepts input test cases expressed in format 225 and does not or might not accept test case not expressed in format 225. The parser analyzes individual test cases in .pcrl file 215 in turn to identify in the tokens (that is, strings with assigned meaning in lexical analysis by the parser, and not to be confused with authorization tokens discussed elsewhere herein) of the test case a sequence of logical syntactic components of the test case and confirm that these components conform to format 225. In one embodiment, the parser parses through—that is, breaks down into logical syntactic components—each line of a test case in .pcrl file 215 and checks to confirm that each line of test case adheres to expected format 225 of test case in .pcrl file.

In one example, the test case file (.pcrl file) is a text file, and the processor parses the text file to confirm that the test cases in the set contained in the text file conform to the expected format 225. As noted above, test case expected format includes a first line of code indicating a beginning of the test case, a second line of code indicating a description of the verification performed by the test case, a third line of code indicating a method of operation of the REST API request, a fourth line of code indicating an input payload for the test case, a fifth line of code indicating an expected result for the test case, a sixth line of code indicating an endpoint of REST API, and a seventh line of code indicating an end of the test case.

In one embodiment where the test case is not in the specified format 225, the parser records test case number in .pcrl file 215 at which unexpected or un-processable formatting occurs, and records the test case number for inclusion in an error message describing the error. In one embodiment, the error message may indicate a specific test case number and what is the issue with the test case which states exactly where the parsing failed. For example, "#Test Case: 3 Null value passed for operation field." In one embodiment, the error message may indicate a test case number or test case description (each of which may be retrieved from the first line of code for the test case). Also, because the parser parses test cases at a token level, rather than at a file level, the particular unexpected token that caused the error is known, as well as what was expected. In one embodiment, the unexpected token and/or expected content may be recorded for inclusion in the error message describing the error. Thus, in one embodiment, the error message may indicate clearly what is incorrect at the point that parsing failed, and guidance as to how to correct the error. In one embodiment, the functions of decision block 232 are implemented at least in part by format check module 180.

In one embodiment, where a test case is not in the specified format 225, the parser does not abort execution, but instead records a log entry describing the non-conforming test case, skips that test case, and continues with execution of next test case at decision block 230. Thus, in one embodiment, test cases following a bad (nonconforming and unexecutable) test case will be executed, and the bad test case will be skipped. In one embodiment, the parser parses each line of a test case in .pcrl file 215 and checks to confirm that each line of test case adheres to expected format 225 of test case in .pcrl file. Where the test case in .pcrl file is in the expected format 225 (block 232: YES), then processing at decision block 232 completes, and processing continues at processing block 245. Where the .pcrl file is not in the specified format 225 (block 232: NO), then the parser aborts execution of the test case and processing continues at decision block 230.

At process block 245, the parser executes a REST API request for a test case.

In one embodiment, the REST API request is generated and executed by subroutine sub curl_executeRequest( ) In one embodiment, the functions of curl_executeRequest( ) subroutine for creation of the REST API request are implemented at least in part by cURL request generation module 166 of REST API testing parser 120. In one embodiment, the parser processes each line of the test case. The "#Test Case" keyword is a delimiter that indicates the beginning of a test case. When the parser encounters the "#Test Case" keyword in .pcrl file 215, the parser starts processing a test case. The "#End" keyword is a delimiter which indicates the end of a given test case. In between the above two delimiters("#Test Case", "#End") all the lines are parsed one after the other and the values of "operation", "input_params", "validate_params", "url" that are provided in .pcrl file 215 for the test case are stored in respective variables. In one embodiment, the values of "operation", "input_params", "validate_params", "url" describe (at least in part) a REST API request, or are components or parts of a REST API request. In one embodiment, the value of "operation" indicates a type of operation or method for retrieving data from or sending data to a server through a REST API. In one embodiment, the value of the input parameters "input_params" describes a set of key-value pairs of an input payload for the REST API being tested in the test case. In one embodiment, the value of the validation parameters "validate_params" describes a set of key-value pairs, values, or patterns of a result of a REST API request being tested in the test case. In one embodiment, the value of "url" is an endpoint of the REST API—after adding IP of the web server to it becomes a complete address of the data source accessible through the REST API of the test case. In one embodiment, the parser performs a check to determine whether any of the values passed for "operation", "input_params", "url" fields in .pcrl file 215 are null. If any value is null, the parser returns an error, may print an error message in a log file describing the error to the user (for example by indicating the particular null value(s)), and aborts further execution of that test case, proceeding instead to the next test case (if any). Thus, in one example, the processor parses a test case to extract values for parts of a REST API request and one or more parameter values for validation of cURL request output. In particular, extraction of values may include extracting a type of operation of the REST API request from the test case; extracting a set of input parameters that form an input payload of the REST API request from the test case; and extracting a destination address of the application request from the test case.

In one embodiment, once all the fields are confirmed to be not null and are in expected format for a given test case, the parser invokes a subroutine (curl_token( )) that provides an authorization token that is used in a header of a cURL request. In one embodiment, the token provided has an expiry time period of 60 minutes. In one embodiment, the curl_token( ) subroutine is also configured to re-use the token generated for the duration of the expiry time period (for example, for the next 60 minutes) to execute additional cURL requests by the parser. After the expiry time period has elapsed, the token is refreshed or regenerated (which again is used through another expiry time period, such as for the next 60 mins) and used for executing later cURL requests. In one embodiment, the authorization token is automatically generated by the the curl_token( ) subroutine of the parser in response to initiating the execution of the test file by the parser, and then the authorization token is automatically refreshed or regenerated on an as needed basis throughout the execution of the test file by the curl_token ( ) subroutine of the parser. In one embodiment, the curl_token( ) subroutine provides a consistent source of current, valid authorization tokens for use in generating cURL requests to execute test cases. In one embodiment, the curl_token( ) subroutine initially obtains a grant of access with an authorization token, expiry time period, and a refresh token in response to a request (such as a POST request) including credentials to a token endpoint of system 105. The curl_token( ) subroutine provides the authorization token for inclusion in cURL requests for test cases during the time period before the expiry time elapses. The curl_token( ) subroutine automatically tracks the expiry time and, prior to the expiry time elapsing, automatically makes a request including the refresh token to the token endpoint of system 105 to refresh the grant of access and receive a new authorization token, a new expiry time period and new refresh token. The curl_token( ) subroutine then provides the new authorization token for inclusion in cURL requests in place of the previous authorization token. The curl_token( ) subroutine repeats this process of refreshing the authorization token throughout the execution of the test file. In one embodiment, the functions of the curl_token( ) subroutine are implemented at least in part by token generation module 170 of REST API testing parser 120. In this way, the parser automatically maintains availability of an unexpired authorization token throughout test file execution (of multiple test cases, such as all non-disabled and non-skipped test cases in the test file).

In one embodiment, the parser builds or generates a REST API request from parameter values provided in the test case. In one embodiment, the REST API request is a cURL request. Based on the values ("operation", "input_params") passed for a given test case in .pcrl file 215 in combination with selected other fields—including the authorization token, header indicating data format (for example "application/json"), request id (unique identifier of curl request), default values of parameters in the payload (if not provided in the test case) and complete URL (for example "jdbc:oracle:oci:@") indicating data source or database connection (to which the "url" value may be appended)—that are built inside the parser, the sub curl_executeRequest( ) subroutine builds a complete cURL request and executes it. The sub curl_executeRequest( ) subroutine supports execution of POST/PUT/GET/DELETE methods. In one embodiment, the cURL request recites operation value, header information and authorization token followed by the input parameters value(s) (in the order that they appear in the test case), followed by the complete URL (including the appended "url" value). For example, referring to Test Case 1 shown at lines 01-15 of Table 5, the parser extracts the value of "operation": "POST"; the values of input_params: the input parameter name—input parameter value pairs "tenant_name": "tenant1", "database_name": "testdb1", "service_name": "*", "max size": 20, "cpu_count": 1, "admin_password": "@Welcome1234"; and the value of "url":"tenants/tenant1/databases" and assembles a cURL request, for example: curl-X POST-H Accept: application/json"-H "Authorization: Bearer {authorizatio n_token}-H "Content-Type: application/json"-d '{"tenant_name": "tenant1", "data base name": "testdb1", "service_name": "*", "max size": 20, "cpu_count": 1, "ad min password": "@Welcome1234"}', jdbc:oracle:oci: tenants/tenant1/database s.

Thus, in one embodiment, the processor automatically composes the REST API request at least in part from the extracted values for parts of the REST API request.

The parser then executes the generated request using the cURL application. In one embodiment, the functions of curl_executeRequest( ) subroutine for execution of the generated request are implemented at least in part by cURL request execution module 167 of REST API testing parser 120. In one embodiment, the processor automatically executes the cURL request in response to detecting that creation of the cURL request is completed or composed. cURL application 127 causes the cURL request to be delivered to a REST API at the completed URL. Thus, in one example, the processor automatically submits the REST API request for execution by an application.

As shown above, in one embodiment, the parser by default considers the "application/JSON" type for both "Accept" and "Content-Type" headers, and defaults to JSON data format in the request payload. In one embodiment, the parser is configured to send the payload using other data formats. The parser may be configured by the user to pass different values to "Accept" and "Content-Type" or any additional headers, in order to accommodate the other data formats.

In one embodiment, the parser is configured to pass dynamic values in the cURL request. The parser can therefore automate test cases/requests where the value to be passed either in payload or URL is dynamic—for example where the value is system dependent, changing in response to a host system executing the parser, or for example where the value varies across test environments. This functionality offers great flexibility as the test case need be automated only once but can be run in different environments.

Once the parser has thus completed executing a REST API request for a test case, processing at process block 245 completes, and processing continues to process block 255.

At process block 255, the parser processes the response to the test case request from the REST API.

In one embodiment, the parser is configured to validate whether a REST API request is processed as expected or not. Once the parser submits the REST API request (for example by cURL request) to a server, the parser checks the status of the submitted request periodically. Once the request gets processed successfully, the parser validates the response received from the server, and checks if the JSON values provided by the user have expected value in the response or not.

The cURL request submitted to a server through the REST API at process block 245 is converted to a job at the server, and is assigned a job identifier (job-id). In one embodiment, the REST API returns a response to the cURL request. The response includes a JSON key(parameter)-value pair for job-id. The parser receives and stores this response in a first log file for the test case (log 1). In one embodiment, the complete response for the cURL request, including the job identifier is written to the log 1 file.

In one embodiment, the parser is configured to extract the job-id from the first log file. For example, the parser may read the log 1 file and extracts the job identifier from the response information for use in the next step of polling, discussed below. The first log file may contain execution details for multiple tests, such that there may be more than one job-id JSON present in the first log file. In one embodiment, subroutine curl_getJobId( ) of the parser includes instructions for identifying, extracting, and returning the job-id for a given test case from the first log file. In one embodiment, the parser searches the first log file for the JSON job-id parameter for the given test case and returns the value for that job-id parameter. In one embodiment, the functions of subroutine curl_getJobId( ) are implemented at least in part by get job id module 168 of REST API testing parser 120.

In one embodiment, the parser has a unique feature of supporting polling. In case of a POST/PUT/DELETE cURL request, the state of the job initiated by the request is polled. In one embodiment, the job-id may be used to poll a current state of the requested job. In one embodiment, subroutine sub curl_processJobStatus( ) of the parser includes instructions for constructing a request to poll the current state of the requested job. Thus, in one embodiment, using the job-id extracted by curl_getJobId( ) for the given test case, subroutine curl_processJobStatus( ) of the parser constructs a GET job-id cURL request. For example, where execution of subroutine curl_getJobId( ) returns a job-id value of 1 for the given test case, the parser generates a cURL request, for example: curl-X GET-H "Accept: application/json"-H "Authorization: Bearer {authorization_token}-H "{request-id}" jdbc:oracle:oci:@jobs/1

The parser then executes the GET job-id cURL request, and receives an extensive response similar to that shown at lines 005-433 of Table 1 above. In one embodiment, the GET job-id cURL request may be executed multiple times to allow the requested job to be completed or come to a final state. In one embodiment, the parser is configured to poll for the job-id until the job is completed. The job status can be success, failure, duplicate, killed, or timeout. In one embodiment, the parser will not advance to the next test case in the test case file. In one embodiment, polling does not continue indefinitely on the given JSON: instead a maximum time is defined, beyond which polling is terminated and a final GET job-id response is stored in a second log file for the test case (log 2). Thus, in one example, the processor retrieves a value of a result of the execution of the REST API request from the application.

In case of POST/PUT/DELETE cURL request, the polling happens on job-id as discussed above. In case of GET cURL request, polling (repeated requests for current status) occurs only where the custom wait and verify keyword is present in the test case; otherwise, the GET cURL request is executed only one time by the parser, and the response is printed to the log. Accordingly, the parser checks for the special component or keyword "custom_wait_verify" in the test case in .pcrl file 215. If the custom wait verify keyword is present in the test case, then parser executes the test case cURL request and checks the value of a JSON key-value pair in the response. In one embodiment, the parser is configured to wait until a particular value of JSON parameter occurs in the response of the test case cURL request before going for the validation of cURL response. In one embodiment, custom wait and verify functionality is triggered in response to parsing a component or keyword such as "custom_wait_verify" followed by the JSON parameter, the particular value, and a maximum wait time. The custom wait and verify keyword, JSON parameter, particular value, and maximum wait time may be written in .pcrl file 215 in a test case that is desired to be executed and wait until the particular value of the JSON parameter has occurred. Table 4 shows an example test case using the custom wait and verify functionality.

TABLE 4

| 05 | 10 | 15 | 20 | 25 | 30 | 35 | 40 | 45 | 50 | 55 | 60 | 65 |
|----|----|----|----|----|----|----|----|----|----|----|----|----|
| #Test Case 1 | | | | : Check if refresh clone is created for PDB | | | | | | | | |
| #Verify | | | | : Refresh PDB should be recreated | | | | | | | | |
| "operation" | | | | = "GET" | | | | | | | | |
| "input_params" | | | | = "custom wait verify":["lifecycle_state", "AVAILABLE", 1800] | | | | | | | | |
| "validate_params" | | | | = "database_name": "adwrfdb1", "max size": 20, "cpu count": 1, "lifecycle state":"AVAILABLE", "refreshable":true | | | | | | | | |
| "url" | | | | = tenants/eaclonetnt1/databases/adwrfdb1 | | | | | | | | |
| #End | | | | | | | | | | | | |
| 05 | 10 | 15 | 20 | 25 | 30 | 35 | 40 | 45 | 50 | 55 | 60 | 65 |

In this example of the custom wait and verify functionality, the JSON parameter is "lifecycle_state", the particular value for the JSON parameter is "AVAILABLE", and the wait period is 1800 seconds, as shown at lines 04-05 of Table 4. In one embodiment, the parser repeatedly polls the server during the wait period by executing the cURL request for the test case (for example as discussed herein with reference to process block 255) and from the response retrieves the value of the JSON parameter and compares the retrieved value with the particular value (provided in the test case) until either (i) the retrieved value matches the particular value or (ii) the maximum wait time has elapsed, whichever occurs first. In this way, the parser automatically repeats the submission of the REST API request for execution by the application until the earlier of (i) a wait period specified in the test case elapses or (ii) an input parameter specified in the test case matches a particular value specified in the test case. The parser then proceeds for validation of the cURL response. In one embodiment, execution of the custom wait and verify functionality by the parser postpones the test case validation until the wait—for the JSON parameter to be of the particular value or for the maximum wait time to elapse—is completed and a final cURL response is stored in a second log file for the test case (log 2).

In one embodiment, the parser is configured to validate those JSON key-value pairs/values/patterns in the final GET job-id response (stored in log 2) that are indicated for validation in the test case. In one embodiment subroutine curl_validateJobResponse( ) of the parser includes instructions for confirming that the JSON key-value pairs, values, or patterns passed in the test case for validation match with the JSON key-value pairs, values, or patterns seen in the GET job-id response. In one embodiment, execution of subroutine curl_validateJobResponse( ) parses the final GET job-id response (stored in log 2), checks if the JSON (key-value pair) provided in the "validate_params" field of parameters for validation in .pcrl file 215 matches with the JSON for those parameters actually observed in the GET job-id response. If all parameters match, then the test case is considered to be processed successfully. If not all parameters match, the expected response to the test case is not received, and the test case is considered to be processed unsuccessfully. In one embodiment, the parser locates each JSON (key-value pair, value, or pattern) provided in the "validate_params" field for the test case in the GET job-id response, and compares the response with the provided JSON to validate the response. In one embodiment, subroutine curl_validateJobResponse( ) of the parser validates whether or not there is a match of key-value pairs, values, or patterns. Patterns, for example, can be in the form of JSON of simply some statement or regular expression. In one embodiment, subroutine curl_validateJobResponse( ) of the parser performs validation of key-value pair and value item JSON using string matching; and performs validation of patterns using regular expression matching for patterns to confirm the match between key-value pairs/values/patterns provided for validation and the observed GET job-id response. Thus, in one example, the processor determines that the validation parameter and the result are a match. In one embodiment, the parser is configured to validate nested (multi-layer) JSON. Nested JSON is validated up to a level specified by a user, for example by including nested JSON in the validate_params" field for the test case. In one embodiment, the functions of subroutine curl_validateJobResponse( ) are implemented at least in part by job status processing module 169 of REST API testing parser 120.

In one embodiment, a third log file (log 3, _generated.log file) is also generated. The third log file contains only the provided parameters for validation for each test case. The parser matches the provided parameters for validation in the test case with the respective response for that parameter. Where all the validation parameters match their response, then the parser prints the validation parameters as-is, with no change, to the third log file. Where there is any mismatch between a validation parameter and its respective response, then a tag or text indicating a difference, such as "[DIFF]", is appended to that parameter and printed to the third log file. In one embodiment, the subroutine curl_validateJobResponse( ) generates the third log file, which provides an indication of an exact location and/or the exact parameter at which unexpected results (mismatch between JSON key-value pairs/values/patterns provided for validation in the test case and observed JSON key-value pairs/values/patterns in the GET job-id response) occur. For example, these results may be tagged in the log with text such as "[DIFF]" indicating that there is a difference between expected and observed values. For example, in the following log file excerpt, the exact JSON exhibiting unexpected results are tagged with "[DIFF]":
"peer_database_internal_lifecycle_state":"AVAILABLE" [DIFF],
"peer_database_lifecycle_state":"AVAILABLE" [DIFF],
"tenant_name":"tenant1","database_name": "ADWeacls1", "mode":
"READ_WRITE", "permission_level": "RESTRICTED", "lifecycle_state":
"AVAILABLE", "data_guard": true.

In this way, the parser writes output (containing a job identifier) for a job initiated by the application in response to the REST API request into a first log file; writes results of the job into a second log file; writes validation parameters (and any tag indicating the location of a mismatch between provided parameter and result) to a third log file; and combines the job identifier, results, validation parameter, and tag in a consolidated log file of information specific to the test case, and excludes information not related to the test case from the consolidated log file.

Thus, in one embodiment, where the REST API request is a cURL request, the processor receive a first response to the cURL request that includes a job identifier for a job initiated by the application in response to the cURL request; identifies the job identifier; composes a second cURL request including the job identifier to retrieve a current state of the job; repeats submission of the second cURL request until the job is completed; and receives a response to the second cURL request that includes the value of the result. Once the parser has thus completed processing the response to the test case request from the REST API, processing at process block 255 completes, and processing continues to process block 260.

In one embodiment, the parser also generates detailed logs with the information of test cases run which can be referred to by an end user or other system components for debugging or other purposes. At process block 260, the parser generates a detailed log for the test case request.

In one embodiment, the parser is configured to create a consolidated log for each test case. In one embodiment, the parser creates log files for the cURL requests on a per test case basis. For example, when test cases in a test file are executed, the responses may be captured first in a *curl_reponse.log file (log 1). In case of a POST request, the parser then extracts the job id from the received response and keeps polling until the requested job is completed by the server. This response information may be stored in one job_response.log for the entire test case file (.pcrl file). After getting the final response for test case (i.e., after executing the request and polling) the validation of the response happens against the validation parameters provided in the test case. The result of the validation may be stored in the *generated.log file (log 3). There are also request.log files for entire test case files. These log files become huge over the course of executing a test case file, and are therefore difficult to examine. Accordingly, the parser also generates a consolidated log combining all logging information generated on a per test case basis, so that information specific to an individual test is maintained in a discrete log file that is readily understood and easily sharable among users and developers.

In one embodiment, after executing each test case, the parser is configured to generate a consolidated log for the test case which captures all the information of requests sent and response received as part of that test case execution. In one embodiment, the consolidated log includes the log 1, log 2, and log 3 information, for example by writing log 1, log 2 and log 3 information for a test case in consolidated log file. The consolidated log thus contains detailed information of end-to-end execution of a given test case. The consolidated log assists in sharing information specific to test cases among users and developers. The processor thus records a first response to the REST API request in a first log file; records a second response to the Get job-id response in a second log file; records cURL response validation result in third log file and combines the first response, the second response and validation result in a consolidated log file of information for the test case.

As discussed above, the parser is configured to generate various log files (such as log 1, log 2 and log 3) with file names including the 'customname' logfile name prefix. Thus, for example, where the logfile name prefix is given as "example.log", the generated log files for test cases may be named exampleLog1, exampleLog2, exampleConsolidatedLog, etc.

Once the parser has thus completed generating a detailed log for the test case request, processing at process block 260 completes, and processing returns to decision block 230 to determine if loop 240 should repeat for another iteration.

At process block 250, following completion of loop 240, the processor generates a success/failure report for the test cases in the test file.

In one embodiment, as discussed above the parser supports validation of a REST API response for each test case in a .pcrl file. The response can be validated by using key-value pair matching or using regular expression matching. If all the test cases in a given .pcrl file are processed successfully (that is, where validation succeeded for all test cases) then a report file/log file with .SUC extension is generated. If not all of the test cases in a given .pcrl file are processed successfully (that is, where validation failed for at least one test case) a log file with .DIF extension is generated which includes details of mismatch(es) observed for the failed test case in .pcrl file. This provides "self-validation support" to the user.

Based on the validation the parser generates either of the two following log files:

(i) a SUCCESS file—in one embodiment the success file has a ".suc" extension and is a 0 byte file, the generation of which serves to indicate that all the tests in test file are successfully executed and are providing the expected response; or (ii) a FAILURE file—in one embodiment, the failure file has a ".dif" extension and is generated when the expected response for a test case passed in the .pcrl file does not match the actual response received by executing the test case, and may include the details of exact mismatch observed.

Thus, in one example, the processor generates an indication that the REST API is valid for the test case or not valid for the test case. Once the processor has thus completed generating a success/failure report for the test cases in the test file, processing at process block 250 completes, and processing continues to END block 265, where process 200 ends.

Example Test Case File

Table 5 shows an example test case file "test.pcrl" showing code for four test cases that can be executed by the parser:

TABLE 5

```
Test Case 1           : Create pdb under existing tenant
#Verify               : The pdb has to be provisioned
"operation"           = "POST"
"input_params"        = "tenant_name": "tenant1",
                        "database_name": "testdb1",
                        "service_name": "*",
                        "max_size": 20, "cpu_count": 1,
                        "admin_password": "@Welcome1234"
"validate_params"     = "tenant_name": "tenant1",
                        "database_name": "testdb1",
                        "service_name": "*",
                        "max_size": 20, "cpu_count": 1,
                        "status": "SUCCESS"
"url"                 = tenants/tenant1/databases
#End
sleep 100             #waits for 100 seconds before executing Test Case 2
Test Case 2           : Create pdb under existing tenant
#Verify               : The pdb has to be provisioned
"operation"           = "POST"
"input_params"        = "tenant_name": "tenant1",
                        "database_nmae": "testdb2",
                        "service_name": "*",
                        "max_size": 20, "cpu_count": 1,
                        "admin_password": "@Welcome1234"
"validate_params"     = "tenant_name": "tenant1",
                        "database_name": "testdb2",
                        "service_name": "*",
                        "max_size": 20, "cpu_count": 1,
                        "status": "SUCCESS"
"url"                 = tenants/tenant1/databases
#End
#Disable              #Disables following test case (i.e. Test Case 3 only)
Test Case 3           : Create pdb under existing tenant
#Verify               : The pdb has to be provisioned
"operation"           = "POST"
"input_params"        = "tenant_name": "tenant1",
                        "database_name": "testdb3".
                        "service_name": "*",
                        "max_size": 20, "cpu_count": 1,
                        "admin_password": "@Welcome1234"
"validate_params"     = "tenant_name": "tenant1",
                        "database_name": "testdb3",
                        "service_name": "*",
                        "max_size": 20, "cpu_count": 1,
                        "status": "SUCCESS"
"url"                 = tenants/tenant1/databases
#End
exit                  #all test cases below this statement will not be run
Test Case 4           : Create pdb under existing tenant
#Verify               : The pdb has to be provisioned
"operation"           = "POST"
"input_params"        = "tenant_name": "tenant1",
                        "database_name": "testdb4",
                        "service_name": "*",
                        "max_size": 20, "cpu_count": 1,
                        "admin_password": "@Welcome1234"
"validate_params"     = "tenant_name": "tenant1",
                        "database_name": "testdb4",
                        "service_name": "*",
                        "max_size": 20, "cpu_couont": 1,
                        "status": "SUCCESS"
"url"                 = tenants/tenant1/databases
#End
```

—Automatic Generation of Test Case File—

In one embodiment, .pcrl files may be automatically generated by REST API testing parser 120. In one embodiment where software having APIs to be tested has a correct YAML description, the parser may automatically generate the .pcrl file of tests from the YAML description. The system parses the YAML description of the software to identify and store endpoints and methods associated with the endpoints. A user interface (such as a graphical user interface) is automatically generated to show the identified REST APIs or endpoints and methods supported by the software. The user interface is transmitted to and presented on a display associated with a user of the parser. The user interface accepts (and stores) the user's selection of an API and method for which the user wants to execute a test. Based on the selected API and method, the user interface shows a list of available input parameters for the REST API and method and available parameters of interest in a response from that REST API and method, which are automatically generated from the parsed and stored methods. The user interface accepts (and stores) the user's selections of (i) input parameters from the list of available input parameters which the user wants to provide in a test case/request as payload, and (ii) parameters of interest which the user wants to validate in the response. In one embodiment where the software having APIs to be tested does not have a correct YAML description (or where there is no YAML description, then the user interface requests endpoint, method, input parameter(s), and validation parameter(s) from the user to be included in a test case.

Once endpoint, method, input parameter(s), and validation parameter(s) are gathered (either from YAML or from user input), the user interface prompts the user to provide values for the selected input parameter(s) and validation parameter(s), and accepts (and stores) the values input by the user. In one embodiment, the expected type of values for input parameter(s) and validation parameter(s) are identified from the endpoint and method from the YAML description and provided by the user interface. Where the expected type of the value for a parameter is an enumerated type, a set of valid values will be presented in a dropdown or other selectable menu. Once values are provided, the REST API testing parser 120 automatically generates a test case in the test case format from the stored endpoint, method, and user selections, and writes it into a .pcrl file.

The user interface then prompts the user to indicate if an additional test case is to be added to the .pcrl file, and accepts the user's response. If the user's response is yes, the user interface will return to showing the identified REST APIs/endpoints and methods for selection for the next test case, and repeats the above process from that point. In one embodiment, the user interface will present options to apply the sleep feature (described above) between tests, disable any test (as described above), or exit the test process (as described above), and in response to selection of these options, insert the corresponding keyword into the .pcrl file at the appropriate location. Once the user indicates that no additional test cases are to be added to the .pcrl file, the .pcrl file may then be automatically executed by the parser, or the user may be presented with an option to store the completed .pcrl file for later execution, or to proceed to execute the completed .pcrl file with the parser.

Example Method

Figure 3:
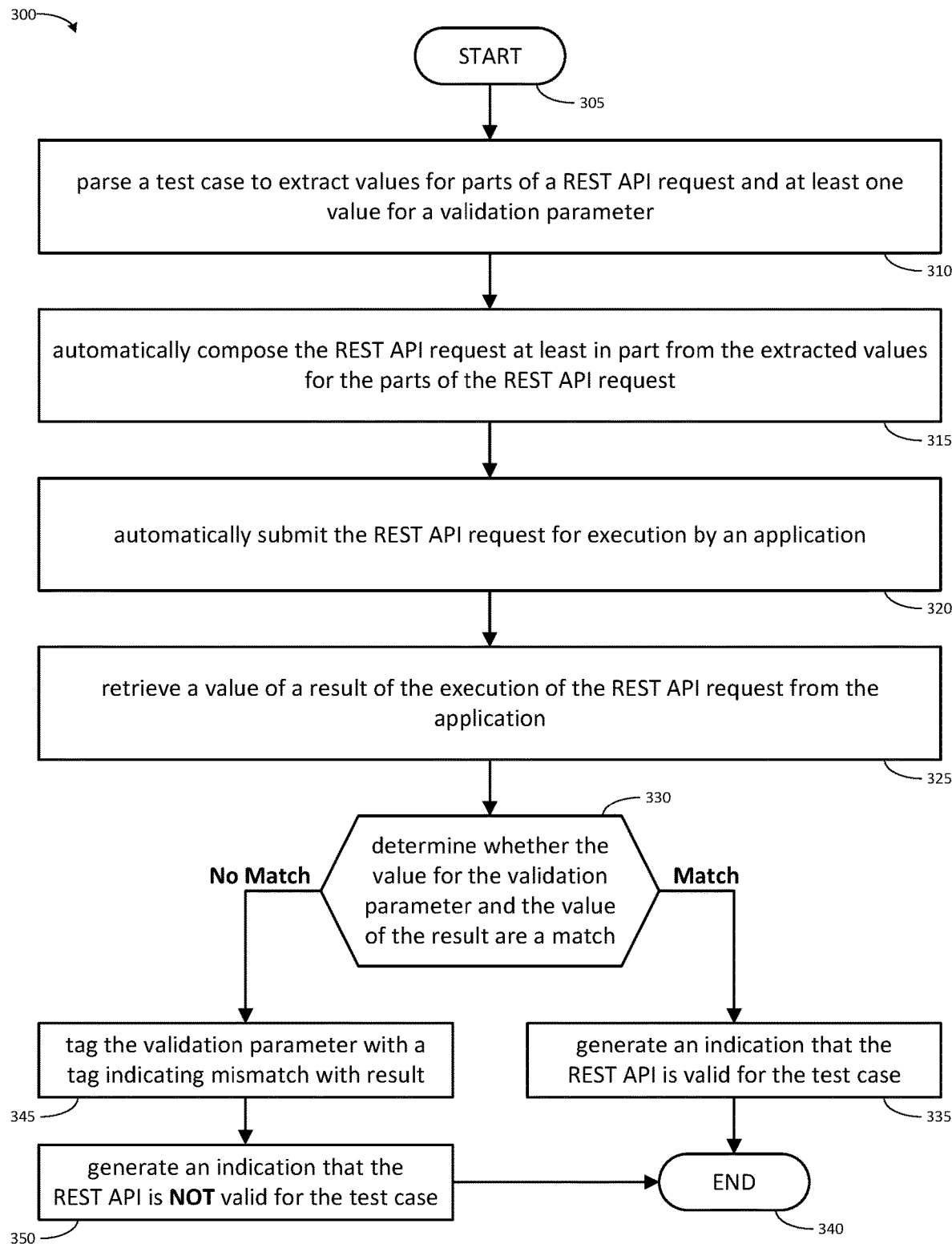
FIG. 3 illustrates one embodiment of a method associated with a REST API parser for test automation.

FIG. 3 illustrates one embodiment of a method 300 associated with a REST API parser for test automation. In one embodiment, the steps of method 300 are performed by REST API testing parser 120 (as shown and described with reference to FIG. 1). The method 300 may be initiated automatically based on various triggers similar to those described above with reference to method 200. The method 300 initiates at START block 305 in response to parsing a signal received or stored data retrieved and determining that the signal or stored data indicates that the method 300 should begin. Processing continues to process block 310.

At process block 310, the processor parses a test case to extract values for parts of a REST API request and a value for one or more validation parameters. In one embodiment, the processor identifies the values of "operation", "input_params", "validate_params", "url" in the test case that describe (at least in part) a REST API request and validation information (for example as shown and described above with reference to process block 245), and stores them for subsequent processing. Processing at process block 310 completes, and processing continues to process block 315.

At process block 315, the processor automatically composes the REST API request at least in part from the extracted values for the parts of the REST API request. In one embodiment, the processor retrieves the values of "operation", "input_params", "url" and inserts them into a template cURL request, along with values for headers and an authentication token. The processor combines "url" with a top-level URL to create a complete URL, and inserts them into the cURL request. The processor then stores the completed cURL request for further processing. In one embodiment, composition of the REST API request is performed as described above with reference to process block 245. Processing at process block 315 completes, and processing continues to process block 320.

At process block 320, the processor automatically submits the REST API request for execution by an application. In one embodiment, in response to completion of the cURL request, the processor executes the cURL request (for example using cURL application 127 to present the REST API request to a REST API 129 of an application or data source of system 105). For example, the automatic submission of the REST API request is performed as shown and described with reference to process block 245. Processing at process block 320 completes, and processing continues to process block 325.

At process block 325, the processor retrieves a value of a result of the execution of the REST API request from the application. In one embodiment, the processor polls the application through the REST API with a GET job-id cURL request, and receives and records the response from the application, for example as shown and described with reference to process block 255. Processing at process block 325 completes, and processing continues to decision block 330.

At decision block 330, the processor determines whether the value for the validation parameter and the value of the result are a match. In one embodiment, the processor compares expected results (from the validate_params field) with observed results of the REST API request to determine whether all observed parameter values match their corresponding expected parameter values. This may be performed, for example, as shown and described with reference to process block 255. Where a match is found (Block 330: MATCH), processing at decision block 330 completes and processing continues to process block 335. Where no match is found (Block 330: NO MATCH), processing at decision block 330 completes and processing continues to process block 345.

At process block 335, the processor generates an indication that the REST API is valid for the test case. In one embodiment, the generation includes creation of a success report/log (such as is shown and described above with reference to process block 250) and presentation of the success report/log to the user, for example by display on a command line prompt or transmission of the report/log to an address (such as an email address) or location (such as a database or a file location) associated with the user. Processing at process block 335 completes, and processing continues to END block 340, where process 300 ends.

At process block 345, the processor tags the validation parameter with a tag that indicates where the value for the validation parameter and the value of the result do not match. In one embodiment, the tagging includes inserting of text adjacent to validation parameters in output written to a log or displayed on a user interface, thereby indicating the exact location and parameter at which a mismatch between provided validation parameter and result from executing the REST API request occurred. This may be performed, for example, as shown and described with reference to process block 255. Processing at process block 345 completes and processing continues to process block 350.

At process block 350, the processor generates an indication that the REST API is NOT valid for the test case. In one embodiment, the generation includes creation of a failure report/log (such as is shown and described above with reference to process block 250) and presentation of the failure report/log to the user, for example by display on a command line prompt or transmission of the report/log to an address (such as an email address) or location (such as a database or a file location) associated with the user. Processing at process block 350 completes, and processing continues to END block 340, where process 300 ends.

—Selected Advantages—

The systems, methods, and other embodiments shown and described herein for a REST API parser for test automation offers a number of advantages not otherwise available for REST API testing. The parser as shown and described herein does not depend on the syntax and semantics of a specific programming language, therefore no pre-existing knowledge of the modules/subroutines of that programming language and their usage is needed on the part of the user, making preparation of test cases an almost zero code solution to the end user. Using the parser as shown and described herein, a user need only write seven lines of code per test case compared to 50 or more lines in Java or Python. Using the parser as shown and described herein, no knowledge on the part of the user of source code base is required in order to write test cases, which is not the case for REST API testing in Java or Python. The parser as shown and described herein thus enables low-code automated testing and validation of REST APIs where such low-code automated testing and validation was not previously possible. Also, the parser as shown and described herein is highly portable—there is no need to download or install any external libraries or software development kits (SDKs) in order to be able to run the automated REST API tests. Further, in one embodiment, polling logic—that is, an algorithm to poll on a particular JSON value to validate that the request has been processed successfully—is also embedded in the parser, thereby eliminating any need to specifically validate a particular JSON value separately. In one embodiment, the parser as shown and described herein auto generates the authorization token and maintains it (by refreshing and regenerating it) during the complete test file execution. The parser while building the cURL request for the test adds this authorization token and other information like different headers to the cURL request. This saves the lot of extra coding and time of the user while writing the tests and thus increases the overall automation speed. In one embodiment, the parser saves all forms of logs at test file level, and also at individual test case level. This really helps in later triaging/debugging. And the individual test case level logs are also easy to share among the users and developers.

As shown and described herein, the systems, methods, and other embodiments shown and described herein for a REST API parser for test automation simulates a new scripting language that improves automation of REST API test generation and execution, improving the technology of distributed and cloud computing systems (for example by speeding deployment of cloud applications and automatically ensuring accurate communications between components of cloud computing systems). In particular, the systems, methods, and other embodiments described herein minimize the amount of code used to define and automatically execute and validate a test case, reducing needed lines of code by an order of magnitude. The systems, methods, and other embodiments described herein eliminates any need to invoke exclusive modules or subroutines to automate any individual test case.

In yaml-based REST API testing, which is a different style of REST API testing, the product under test needs to have a yaml file that is in exactly correct format as a prerequisite for yaml-based REST API testing. Otherwise, SDK generation of tests from the yaml file would fail. The systems, methods, and other embodiments shown and described herein for a REST API parser for test automation obviates the need for having a yaml file to do the testing, which makes it possible to test products without yaml file.

The systems, methods, and other embodiments shown and described herein for a REST API parser for test automation performs token based parsing of tests kept in a text file, which contains the json key-value pairs in simple text format. The test file is not a json or yaml file. Writing tests in json/yaml files is complex, lengthy and stringent and need to adhere to strict syntax. The parser as shown and described herein has simple test format which results in minimal test writing, and makes future maintenance and debugging of tests easier. Since the REST API parser for test automation shown and described herein does token based parsing of a text file of tests, the entire test file need not be syntactically correct. If the test file format had been json/yaml, where parsing is done at the file level, not a single test case would run with even one syntax error, which could be difficult to detect. But token-based parsing of the parser as shown and described herein does makes it possible to run the correct test cases and skip the wrong test cases. This technical improvement to REST API test automation further provides economies of scale by enabling, for example, 1000 REST API test cases to be written in 7000 lines of code, instead of in 50,000 or more lines, and by enabling re-use of already-written test cases in different test case suites. Note that this dramatically reduces the amount of processor operations needed in order to interpret or compile test code, enabling improved computing performance on the same hardware when running REST API tests. Further, the simplicity and uniformity of the .pcrl test case format eliminates a need for coding expertise on the part of the user. Due to the parser-style functionality, the systems, methods, and other embodiments described herein offer greater customization, flexibility, and re-usability in automation of test cases, for example supporting features such as exit, sleep, disable, ability to pass dynamic values in cURL request, variable support, and other features that are not available in other methods of REST API testing. Also, the systems, methods, and other embodiments described herein enable specific attention and focus on validation of particular JSON elements, where such specific focus was not previously possible, requiring users to manually wade through huge result sets. The systems, methods, and other embodiments described herein also embed polling logic in the parser tool which automates retrieval of test results for validation of REST APIs.

The systems, methods, and other embodiments shown and described herein for a REST API parser for test automation can pinpoint to the exact deviance of actual response from the expected response with the identifier 'DIFF'. It presents to the end user 'only' the json's of his interest with any deviance marked as DIFF, without having to dig through huge responses to find deviances therein.

The systems, methods, and other embodiments shown and described herein for a REST API parser for test automation can do autonomous test verification where expected and actual outcomes can be compared without user's intervention. The user need not even maintain any references of expected behavior to compare against actual behavior.

In summary, the systems, methods, and other embodiments of a REST API parser for test automation as described herein provide a near zero-code solution without any dependency on programming language, external libraries or software development kits, or test case specific coding, and which offers features for customization, flexibility, and re-usability due to the parser-style functionality that are not available in other methods of REST API testing.

Software Module Embodiments

Software instructions may be designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific, task, process, function, or operation. The entire set of modules may be controlled or coordinated in their operation by a main program for the system, an operating system (OS), or other form of organizational platform.

In one embodiment, one or more of the components described herein are configured as program modules stored in a non-transitory computer readable medium. The program modules are configured with stored instructions that when executed by at least a processor cause the computing device to perform the corresponding function(s) as described herein. In one embodiment, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

Cloud or Enterprise Embodiments

In one embodiment, the present system (such as system 100) includes a computing/data processing system including a computing application or collection of distributed computing applications (such as REST API testing parser 120) for access and use by other client computing devices associated with an enterprise (such as the client devices 145, 150, 155 and 160 of enterprise network 115). The system and client computing devices communicate with each other over a network (such as network 110). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system implements a centralized server-side application that provides at least one or more of the functions disclosed herein and a graphical user interface to access and operate them, and that is accessed by many users through computing devices/terminals communicating with the present computing system (functioning as the server) over a computer network. In one embodiment, cloud infrastructure system 105 (including REST API testing parser 120) may be implemented on on-premises infrastructure, such as a set of one or more dedicated servers. In one embodiment the present system provides at least one or more of the functions disclosed herein and a graphical user interface to access and operate the functions.

Computing Device Embodiment

Figure 4:
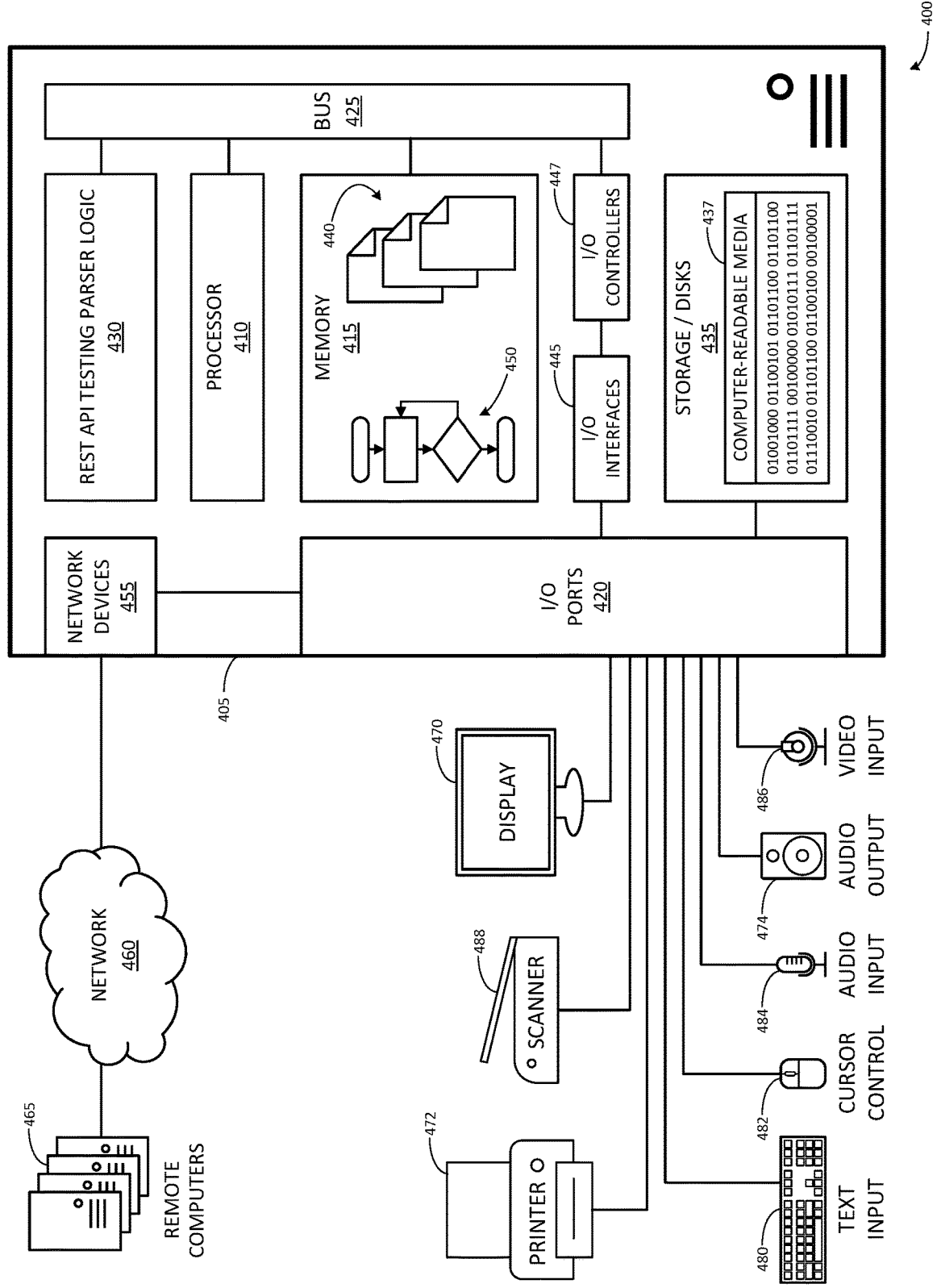
FIG. 4 illustrates an embodiment of a computing system configured with the example systems and/or methods disclosed.

FIG. 4 illustrates an example computing device 400 that is configured and/or programmed as a special purpose computing device with one or more of the example systems and methods described herein, and/or equivalents. The example computing device 400 may be a computer 405 that includes at least one hardware processor 410, a memory 415, and input/output ports 420 operably connected by a bus 425. In one example, the computer 405 may include REST API testing parser logic 430 configured to facilitate operation of a REST API parser for test automation similar to the logic, systems, methods, and other embodiments shown in and described with reference to FIGS. 1-3.

In different examples, the logic 430 may be implemented in hardware, a non-transitory computer-readable medium 437 with stored instructions, firmware, and/or combinations thereof. While the logic 430 is illustrated as a discrete hardware component attached to the bus 425, it is to be appreciated that in other embodiments, the logic 430 could be implemented in the processor 410, stored in memory 415, or stored in disk 435.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate operation of a REST API parser for test automation. The means may also be implemented as stored computer executable instructions that are presented to computer 405 as data 440 that are temporarily stored in memory 415 and then executed by processor 410.

Logic 430 may also provide means (e.g., hardware, non-transitory computer-readable medium that stores executable instructions, firmware) for operating a REST API parser for test automation.

Generally describing an example configuration of the computer 405, the processor 410 may be a variety of various processors including dual microprocessor and other multi-processor architectures. A memory 415 may include volatile memory and/or non-volatile memory. Non-volatile memory may include, for example, ROM, PROM, and so on. Volatile memory may include, for example, RAM, SRAM, DRAM, and so on.

A storage disk 435 may be operably connected to the computer 405 via, for example, an input/output (I/O) interface (e.g., card, device) 445 and an input/output port 420 that are controlled by at least an input/output (I/O) controller 447. The disk 435 may be, for example, a magnetic disk drive, a solid state drive (SSD), a floppy disk drive, a tape drive, a Zip drive, a flash memory card, a memory stick, and so on. Furthermore, the disk 435 may be an optical drive, such as a CD-ROM drive, a CD-R drive, a CD-RW drive, a DVD ROM, and so on. The memory 415 can store a process 450 and/or a data 440, for example. The disk 435 and/or the memory 415 can store an operating system that controls and allocates resources of the computer 405.

The computer 405 may interact with, control, and/or be controlled by input/output (I/O) devices via the input/output (I/O) controller 447, the I/O interfaces 445, and the input/ output ports 420. Input/output devices may include, for example, one or more displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 435, network devices 455, and so on. The input/output ports 420 may include, for example, serial ports, parallel ports, and USB ports.

The computer 405 can operate in a network environment and thus may be connected to the network devices 455 via the I/O interfaces 445, and/or the I/O ports 420. Through the network devices 455, the computer 405 may interact with a network 460. Through the network, the computer 405 may be logically connected to remote computers 465. Networks with which the computer 405 may interact include, but are not limited to, a LAN, a WAN, and other networks.

—Data Operations—

Data can be stored in memory by a write operation, which stores a data value in memory at a memory address. The write operation is generally: (1) use the processor to put a destination address into a memory address register; (2) use the processor to put a data value to be stored at the destination address into a memory data register; and (3) use the processor to copy the data from the memory data register to the memory cell indicated by the memory address register. Stored data can be retrieved from memory by a read operation, which retrieves the data value stored at the memory address. The read operation is generally: (1) use the processor to put a source address into the memory address register; and (2) use the processor to copy the data value currently stored at the source address into the memory data register. In practice, these operations are functions offered by separate software modules, for example as functions of an operating system. The specific operation of processor and memory for the read and write operations, and the appropriate commands for such operation will be understood and may be implemented by the skilled artisan.

Generally, in some embodiments, references to storage or storing indicate storage as a data structure in memory or storage/disks of a computing device (such as memory 415, or storage/disks 435 of computing device 405 or remote computers 465).

Further, in some embodiments, a database associated with the method may be included in memory. In a database, the storage and retrieval functions indicated may include the self-explanatory 'create,' read, 'update,' or 'delete' data (CRUD) operations used in operating a database. These operations may be initiated by a query composed in the appropriate query language for the database. The specific form of these queries may differ based on the particular form of the database, and based on the query language for the database. For each interaction with a database described herein, the processor composes a query of the indicated database to perform the unique action described. If the query includes a 'read' operation, the data returned by executing the query on the database may be stored as a data structure in a data store, such as file system 130, or in memory.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Acronyms and initialisms used herein have the following meanings:

ADB: Oracle Autonomous Database;
API: application programming interface;
ASIC: application-specific integrated circuit;
CD: compact disk;
CD-R: CD recordable;
CD-RW: CD rewriteable;
CPU: central processing unit;
CRUD: create, read, update, delete;
DRAM: dynamic RAM;
DVD: digital versatile disk and/or digital video disk;

GPU: graphics processing unit;
GUI: graphical user interface;
HDD: hard disk drive;
HPC: high-performance computing;
HTTP: hypertext transfer protocol;
HTTPS: hypertext transfer protocol secure;
I/O: input/output;
IAAS: infrastructure-as-a-service;
JSON: JavaScript object notation;
LAN: local area network;
ML: machine learning;
NAS: network-attached storage;
OS: operating system;
PAAS: platform-as-a-service;
PROM: programmable ROM;
RAM: random access memory;
REST: representational state transfer;
ROM: read only memory;
SAAS: software-as-a-service;
SOAP: simple object access protocol
SQL: structured query language;
SRAM: synchronous RAM;
SSD: solid-state storage device;
TCP/IP: Transmission Control Protocol/Internet Protocol
USB: universal serial bus;
WAN: wide area network; and
XML: extensible markup language.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method for automating representational state transfer (REST) application programming interface (API) testing, the computer-implemented method comprising:
    parsing a first test case to extract values for parts of a REST API request and at least one value for a validation parameter;
    automatically composing the REST API request at least in part from the extracted values for the parts of the REST API request;
    automatically submitting the REST API request for execution by an application;
    retrieving a value of a result of the execution of the REST API request from the application;
    determining that the at least one value for the validation parameter and the value of the result of the execution of the REST API request are not a match;
    tagging the validation parameter with a tag that indicates where the at least one value for the validation parameter and the value of the result of the execution of the REST API request do not match; and
    generating an indication that the REST API is not valid for the first test case.

2. The computer-implemented method of claim 1, wherein the extraction of values for the parts of the REST API request further comprises:
    extracting a type of operation of the REST API request from the first test case;
    extracting a set of input parameters that form an input payload of the REST API request from the first test case; and
    extracting a destination address of the REST API request from the first test case.

3. The computer-implemented method of claim 1, further comprising:
    receiving a test file of text that includes the first test case among a set of test cases; and
    parsing the test file to confirm that test cases of the set of test cases conform to an expected format, wherein the expected format includes a first line of code indicating a beginning of the first test case, a second line of code indicating a description of a verification performed by the first test case, a third line of code indicating a method of operation of the REST API request, a fourth line of code indicating an input payload for the first test case, a fifth line of code indicating an expected result for the first test case, a sixth line of code indicating an address for the application, and a seventh line of code indicating an end of the first test case.

4. The computer-implemented method of claim 1, further comprising parsing a keyword in a test file of text that includes the first test case that prevents execution of a second test case in the test file of text.

5. The computer-implemented method of claim 1, further comprising parsing a keyword in a test file of text that includes the first test case that delays execution of a second test case in the test file of text.

6. The computer-implemented method of claim 1, further comprising:
    receiving a test file of text that includes the first test case among a set of test cases;
    automatically maintaining availability of an unexpired authorization token throughout test file execution; and
    including the unexpired authorization token in the REST API request during the automatic composition of the REST API request.

7. The computer-implemented method of claim 1, further comprising:
    writing a job identifier for a job initiated by the application in response to the REST API request into a first log file;
    writing results of the job into a second log file;
    writing the validation parameter and the tag to a third log file; and
    combining the job identifier, the results, the validation parameter, and the tag in a consolidated log file of information for the test case.

8. The computer-implemented method of claim 1, wherein the REST API request is a first cURL request, the computer-implemented method further comprising:
    receiving a first response to the first cURL request that includes a job identifier for a job initiated by the application in response to the first cURL request;
    identifying the job identifier;
    composing a second cURL request including the job identifier to retrieve a current state of the job;
    repeating submission of the second c URL request until the job is completed; and
    receiving a second response to the second cURL request that includes the value of the result of the execution of the REST API request.

9. The computer-implemented method of claim 1, further comprising:
    detecting that a part of the REST API request in the test case is a variable;
    replacing the variable in the test case with a value of the variable; and
    including the value of the variable in the automatically composed REST API request.

10. A non-transitory computer-readable medium that includes computer-executable instructions stored thereon for automating representational state transfer (REST) application programming interface (API) testing that, when executed by at least a processor of a computer, cause the computer to:
    parse a first test case to extract values for parts of a REST API request and at least one value for a validation parameter;
    automatically compose the REST API request at least in part from the extracted values for the parts of the REST API request;
    automatically submit the REST API request for execution by an application;
    retrieve a value of a result of the execution of the REST API request from the application;
    determine that the at least one value for the validation parameter and the value of the result of the execution of the REST API request are a match; and
    generate an indication that the REST API is valid for the first test case.

11. The non-transitory computer-readable medium of claim 10, further comprising computer-executable instructions that, when executed by at least the processor of the computer, cause the computer to:
    extract a type of operation of the REST API request from the first test case;
    extract a set of input parameters that form an input payload of the REST API request from the first test case; and
    extract a destination address of the REST API request from the first test case.

12. The non-transitory computer-readable medium of claim 10, further comprising computer-executable instructions that, when executed by at least the processor of the computer, cause the computer to:
receive a test file of text that includes the first test case among a set of test cases; and
parse the test file to confirm that test cases of the set of test cases conform to an expected format, wherein the expected format includes a first line of code indicating a beginning of the first test case, a second line of code indicating a description of a verification performed by the first test case, a third line of code indicating a method of operation of the REST API request, a fourth line of code indicating an input payload for the first test case, a fifth line of code indicating an expected result for the first test case, a sixth line of code indicating an address for the application, and a seventh line of code indicating an end of the first test case.

13. The non-transitory computer-readable medium of claim 10, further comprising computer-executable instructions that, when executed by at least the processor of the computer, cause the computer to parse a keyword in a test file of text that includes the first test case that delays or prevents execution of a second test case in the test file of text.

14. The non-transitory computer-readable medium of claim 10, further comprising computer-executable instructions that, when executed by at least the processor of the computer, cause the computer to:
automatically maintain availability of an unexpired authorization token throughout execution of multiple test cases; and
include the unexpired authorization token in the REST API request.

15. The non-transitory computer-readable medium of claim 10, wherein the REST API request is a first cURL request, further comprising computer-executable instructions that, when executed by at least the processor of the computer, cause the computer to:
receive a first response to the first cURL request that includes a job identifier for a job initiated by the application in response to the first cURL request;
record the first response in a first log file;
identify the job identifier;
compose a second c URL request including the job identifier to retrieve a current state of the job;
repeat submission of the second cURL request until the job is completed;
receive a second response to the second cURL request that includes the value of the result of the execution of the REST API request;
record the second response in a second log file;
record a validation result in a third log file; and
combine the first response, the second response, and the validation result in a consolidated log file of information for the test case.

16. The non-transitory computer-readable medium of claim 10, further comprising computer-executable instructions that, when executed by at least the processor of the computer, cause the computer to automatically repeat the automatic submission of the REST API request for execution by the application until the earlier of (i) a wait period specified in the test case elapses or (ii) an input parameter specified in the test case matches a particular value specified in the test case.

17. A computing system comprising:
a processor;
a memory operably connected to the processor; and
a non-transitory computer-readable medium operably connected to the processor and storing computer-executable instructions for automating representational state transfer (REST) application programming interface (API) testing that, when executed by at least the processor of the computing system, cause the computing system to:
parse a first test case to extract values for parts of a REST API request and at least one value for a validation parameter;
automatically compose the REST API request at least in part from the extracted values for the parts of the REST API request;
automatically submit the REST API request for execution by an application;
retrieve a value of a result of the execution of the REST API request from the application;
determine that the at least one value for the validation parameter and the value of the result of the execution of the REST API request are a match; and
generate an indication that the REST API is valid for the first test case.

18. The computing system of claim 17, wherein the computer-executable instructions that, when executed by at least the processor of the computing system, further cause the computing system to:
extract a type of operation of the REST API request from the first test case;
extract a set of input parameters that form an input payload of the REST API request from the first test case; and
extract a destination address of the REST API request from the first test case.

19. The computing system of claim 17, wherein the computer-executable instructions that, when executed by at least the processor of the computing system, further cause the computing system to parse a keyword in a test file of text that includes the first test case that delays or prevents execution of a second test case in the test file of text.

20. The computing system of claim 17, wherein the computer-executable instructions that, when executed by at least the processor of the computing system, further cause the computing system to:
automatically maintain availability of an unexpired authorization token throughout execution of multiple test cases; and
include the unexpired authorization token in the REST API request.

* * * * *

UNITED STATES PATENT AND TRADEMARK OFFICE
CERTIFICATE OF CORRECTION

PATENT NO. : 11,797,431 B2
APPLICATION NO. : 17/561221
DATED : October 24, 2023
INVENTOR(S) : Bollepally et al.

Page 1 of 2

It is certified that error appears in the above-identified patent and that said Letters Patent is hereby corrected as shown below:

In the Specification

In Column 2, Line 25, after ""name":" insert -- "*", --, therefor.

In Column 2, Line 26, after ""tenant_name":" insert -- "*", --, therefor.

In Column 2, Line 27, after ""database_name":" insert -- "*", --, therefor.

In Column 2, Line 28, after ""guid":" insert -- "*", --, therefor.

In Column 2, Line 29, after ""id":" insert -- "*", --, therefor.

In Column 2, Line 31, after "'global_tenant_id":" insert -- "*", --, therefor.

In Column 2, Line 37, after ""console_url":" insert -- "*", --, therefor.

In Column 3, Line 39, above "#Test Case N :<Describe test case>" insert -- 05 10 15 20 25 30 35 40 45 50 55 60 65 --, therefor.

In Column 9, Line 13, delete ""custom name" and insert -- "customname --, therefor.

In Column 9, Line 41, delete "Jog" and insert -- .log --, therefor.

In Column 14, Line 35, after "by the" delete "the".

In Column 15, Line 31, delete "{authorizatio n" and insert -- {authorization --, therefor.

In Column 15, Line 34, delete ""ad min" and insert -- "admin --, therefor.

In Column 15, Line 35, after "oci:" insert -- @ --, therefor.

Signed and Sealed this
Eleventh Day of June, 2024

Katherine Kelly Vidal
*Director of the United States Patent and Trademark Office*

In Column 15, Lines 35-36, delete "database s." and insert -- databases. --, therefor.

In Column 16, Line 57, delete "jobs/1" and insert -- jobs/1. --, therefor.

In Column 19, Line 50, delete "job" and insert -- *job --, therefor.

In Column 30, Line 40, delete "U.S.C" and insert -- U.S.C. --, therefor.

In Column 31, Line 62, delete "U.S.C" and insert -- U.S.C. --, therefor.

In the Claims

In Column 34, Line 21, in Claim 8, delete "c URL" and insert -- cURL --, therefor.

In Column 35, Line 43, in Claim 15, delete "c URL" and insert -- cURL --, therefor.